US008832102B2

(12) United States Patent
Mehta et al.

(10) Patent No.: US 8,832,102 B2
(45) Date of Patent: Sep. 9, 2014

(54) METHODS AND APPARATUSES FOR CLUSTERING ELECTRONIC DOCUMENTS BASED ON STRUCTURAL FEATURES AND STATIC CONTENT FEATURES

(75) Inventors: Rupesh R. Mehta, Maharashtra (IN); Srinivasan H. Sengamedu, Karnataka (IN); Rajeev R. Rastogi, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 301 days.

(21) Appl. No.: 12/685,945

(22) Filed: Jan. 12, 2010

(65) Prior Publication Data
US 2011/0173197 A1     Jul. 14, 2011

(51) Int. Cl.
*G06F 17/30* (2006.01)
*G06F 7/00* (2006.01)

(52) U.S. Cl.
CPC .... *G06F 17/30864* (2013.01); *G06F 17/30705* (2013.01)
USPC ............ 707/737; 707/749; 707/769; 707/796

(58) Field of Classification Search
None
See application file for complete search history.

(56) References Cited

U.S. PATENT DOCUMENTS

| | | | | |
|---|---|---|---|---|
| 5,926,812 | A * | 7/1999 | Hilsenrath et al. ............ | 707/737 |
| 6,947,933 | B2 * | 9/2005 | Smolsky ...................... | 707/693 |
| 7,490,052 | B2 * | 2/2009 | Kilger et al. ................. | 705/7.31 |
| 8,090,720 | B2 * | 1/2012 | Tsai et al. .................... | 707/737 |
| 8,161,048 | B2 * | 4/2012 | Procopiuc et al. ............ | 707/737 |
| 8,239,387 | B2 * | 8/2012 | Madaan et al. ............... | 707/737 |
| 8,285,719 | B1 * | 10/2012 | Long et al. .................... | 707/737 |
| 8,352,489 | B1 * | 1/2013 | Covell .......................... | 707/769 |
| 2005/0203970 | A1 * | 9/2005 | McKeown et al. ............ | 707/203 |
| 2008/0046441 | A1 * | 2/2008 | Wen et al. ..................... | 707/100 |
| 2008/0275969 | A1 * | 11/2008 | Saba ............................. | 709/220 |
| 2008/0275979 | A1 * | 11/2008 | Saba ............................. | 709/223 |
| 2009/0019062 | A1 * | 1/2009 | Saba ............................. | 707/10 |
| 2009/0216708 | A1 | 8/2009 | Madaan et al. | |
| 2009/0259641 | A1 * | 10/2009 | Balmin et al. .................... | 707/4 |
| 2010/0211894 | A1 * | 8/2010 | Jahr et al. ...................... | 715/762 |

OTHER PUBLICATIONS

Kutty, XCFS—a novel approach for clustering XML documents using both the structure and the content, In: Association for Computing Machinery, Nov. 2-6, 2009, Asia World Expo, Hong Kong, pp. 1-11.*
Smiljanic, XML Schema Matching: Balancing Efficiency and Effectiveness by Means of Clustering, Dissertation, Apr. 21, 2006, University of Twente, pp. 1-182.*
Kraft, "Vagueness and Uncertainty in Information Retrieval: How can Fuzzy sets help?",2007, ACM, pp. 1-10.*
Buttler, "A Short Survey of Document Structure Similarity Algorithms," Mar. 5, 2004, The 5th International Conference on Internet Computing, Las Vegas, NV, Jun. 21, 2004 through Jun. 24, 2004, pp. 1-9.*
INEX 2002 Workshop Proceedings, Dec. 9-11, 2002, Schloss Dagstuhl International Conference and Research Center for Computer Science, pp. 1-126.*

(Continued)

*Primary Examiner* — Kaveh Abrishamkar
*Assistant Examiner* — James J Wilcox
(74) *Attorney, Agent, or Firm* — Berkeley Law & Technology Group, LLP (57) ABSTRACT

Exemplary methods and apparatuses are provided which may be implemented using one or more computing devices to allow for super clustering of clusters of electronic documents based, at least in part, on structural and static content features.

20 Claims, 2 Drawing Sheets

(56) References Cited

OTHER PUBLICATIONS

Zheng et al., "Joint Optimization of Wrapper Generation and Template Detection" KKD '07, San Jose, CA, Aug. 12-15, 2007, 9 pages.

Buttler, "A Short Survey of Document Structure Similarity Algorithms" In Proceedings of the 5th International Conference on Internet Computing, Las Vegas, NV, Jun. 21-Jun. 24, 2004, 7 pages.

* cited by examiner

METHODS AND APPARATUSES FOR CLUSTERING ELECTRONIC DOCUMENTS BASED ON STRUCTURAL FEATURES AND STATIC CONTENT FEATURES

BACKGROUND

1. Field

The subject matter disclosed herein relates to data processing.

2. Information

The Internet is a worldwide system of computer networks. The most widely used part of the Internet is the World Wide Web, often abbreviated "WWW" or simply referred to as just "the web". The web is an Internet service that organizes information through the use of hypermedia. A HyperText Markup Language ("HTML") or other like markup language, for example, is typically used to specify the contents and format of an electronic document (e.g., a web page).

Through the use of the web, individuals have access to millions of pages of information. However a significant drawback with using the web is that because there is so little organization, at times it can be extremely difficult for users to locate the particular pages that contain the information that is of interest to them. To address this problem, "search engines" have been developed to index a large number of web pages and to provide an interface that can be used to search the indexed information by entering certain words or phases to be queried.

Search engines may generally be constructed using several common functions. Typically, each search engine has one or more "web crawlers" (also referred to as "crawler", "spider", "robot") that "crawls" across the Internet in a methodical and automated manner to locate web documents around the world. Upon locating a document, the crawler stores the document's URL, and follows any hyperlinks associated with the document to locate other web documents. Also, each search engine may include information extraction and indexing mechanisms that extract and index certain information about the documents that were located by the crawler. In general, index information is generated based on the contents of the HTML file associated with the document. The indexing mechanism stores the index information in large databases that can typically hold an enormous amount of information. Further, each search engine provides a search tool that allows users, through a user interface, to search the databases in order to locate specific documents, and their location on the web (e.g., a URL), that contain information that is of interest to them.

With the advent of e-commerce, many web pages are dynamic in their content. Typical examples are products sold at discounted prices that change periodically, or hotel rooms that may change their room fares on a seasonal basis. Therefore, it may be desirable to update crawled content on frequent and near real-time bases.

Information Extraction (IE) systems may be used to gather and manipulate the unstructured and semi-structured information on the web and populate backend databases with structured records. In a website with a reasonable number of pages, information (e.g., products, jobs, etc.) is typically stored in a backend database and is accessed by a set of scripts for presentation of the information to the user. IE systems commonly use extraction templates to facilitate the extraction of desired information from a group of web pages. Generally, an extraction template is based on the general layout of the group of pages for which the corresponding extraction template is defined. Such systems may face difficulties due to the complexity and variability of the large numbers of web pages from which information is to be gathered. Such systems may require a great deal of cost, both in terms of computing resources and time. Such systems often require grouping of structurally similar pages within a website, for example, in order to be able to more accurately extract certain information. Also, relatively large expenses may be incurred in some situations by the need for human intervention during the information extraction process.

With so much information being available and often changing over time, there is a continuing need for methods and apparatuses that allow for certain information to be easily identified and monitored in an efficient manner.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Exemplary methods and apparatuses are provided which may be implemented using one or more computing devices to allow for super clustering of clusters of electronic documents based, at least in part, on structural and static content features.

In accordance with certain example implementations, methods and apparatuses are provided herein determine certain structural features and certain static content features associated with a plurality of electronic documents. Using the example techniques described below, some of these electronic documents may be partitioned into a plurality of clusters and some of these clusters may be selectively merged to form at least one super cluster based, at least in part, on the determined structural and static content features. Thus, for example, a super cluster may comprise or otherwise identify clusters of electronic documents having similar structures and possibly similar schemas.

Figure 1:
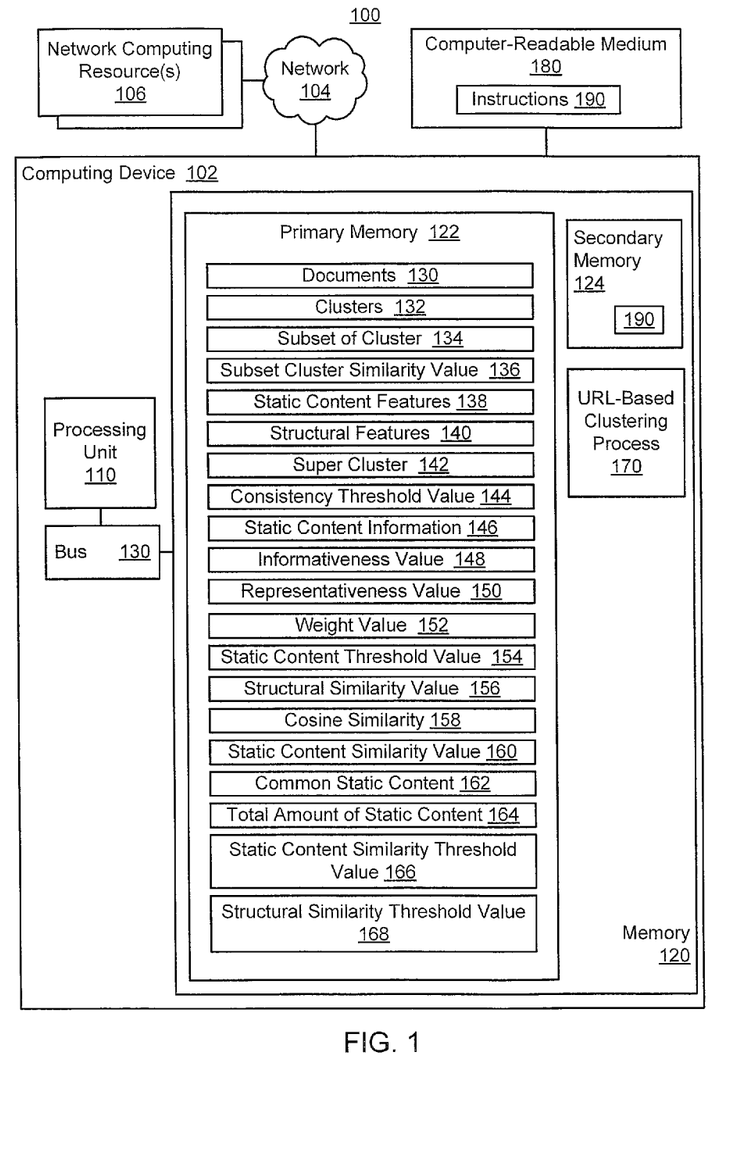
FIG. 1 is a schematic block diagram illustrating an example implementation of computing environment having one or more computing devices operatively enabled for use in clustering electronic documents, in accordance with certain example implementations.

Reference is now made to FIG. 1 is a schematic diagram illustrating an example computing environment 100 which comprises at least one computing device 102 for use in clustering electronic documents. In this example, computing device 102 is coupled to a network 104 along with one or more network computing resources 106. By way of non-limiting example, computing device 102 may be enabled within and/or the support in some manner, a network based information identification and/or extraction service capable of locating electronic documents available over network 104, e.g., form one or more network computing resources 106. Thus, for example, computing device 102 may comprise a backend server or other like data processing mechanism enabled to support a crawler, an information extraction engine, a search index, a search engine, and/or other like capabilities.

Computing device 102 may, for example, comprise one or more processing units 110 operatively coupled to a memory 120, e.g., via one or more electrical signals carried by one or more conductors and/or other like circuitry illustrated here by bus 130.

As shown here, processing units 110 are representative of one or more circuits configurable to perform at least a portion of a data computing procedure or process. By way of example but not limitation, processing units 110 may include one or more processors, controllers, microprocessors, microcontrollers, application specific integrated circuits, digital signal processors, programmable logic devices, field programmable gate arrays, and the like, or any combination thereof.

As shown here, memory 120 is representative of any data storage mechanism. Memory 120 may include, for example, a primary memory 122 and/or a secondary memory 124. Primary memory 122 may include, for example, a solid state memory such as a random access memory, read only memory, etc. While illustrated in this example as being separate from processing units 110, it should be understood that all or part of primary memory 122 may be provided within or otherwise co-located/coupled with processing units 110.

Secondary memory 124 may include, for example, the same or similar type of memory as primary memory and/or one or more data storage devices or systems, such as, for example, a disk drive, an optical disc drive, a tape drive, a solid state memory drive, etc. In certain implementations, secondary memory 124 may include and/or be operatively receptive of, or otherwise configurable to couple to, a computer-readable medium 180. Computer-readable medium 180 may include, for example, any media that can carry and/or make accessible data, code and/or instructions 190 for use, at least in part, by processing units 110 and/or other circuitry (not shown) within computing device 102.

As illustrated by some non-limiting examples in FIG. 1, memory 120 may at times have various data, code and/or instructions stored therein. For example, as described in greater detail below memory 120 may store (e.g., via one or more electrical signals) a plurality of electronic documents 130, a plurality of clusters 132, a selected subset of the clusters 134, a subset cluster similarity value 136, static content features 138, structural features 140, a super cluster 142, a desired consistency threshold value 144, nodal path static content information 146, a nodal path informativeness value 148, a nodal path representativeness value 150, a nodal path weight value 152, a static content threshold value 154, a structural similarity value 156, a cosine similarity 158 (e.g., a function), a static content similarity value 160, a measurement of an amount of common static content 162, a measurement of a total amount of static content 164, a static content similarity threshold value 166, a structural similarity threshold value 168, a Uniform Resource Locator (URL)-based clustering process 170, various instructions 190, and/or the like.

Network 104 may represent one or more communication networks and/or other like systems. For example, network 104 may include one or more wired and/or wireless telecommunication systems or networks, one or more local area networks or the like, an intranet, the Internet, etc. In certain example implementations, network computing resources 106 may represent one or more computing devices and/or services from which various types/forms of files and/or electronic documents may be downloaded, or conversely uploaded. By way of example but not limitation, network computing resources 106 may include one or more servers and/or other like computing devices which host various websites, web pages, databases, and/or other like communication and/or information related services.

For the sake of brevity, the term "electronic document" or simply "documents" as used herein is intended to broadly represent any form of information, such as, e.g., data and/or executable instructions or other like functionality, that computing devices within computing environment 100 may seek to locate, identify, search, and/or exchange over network 104. A non-limiting example of a document is a web page that may be associated with a web site accessible over the World Wide Web portion of the Internet, and/or the like. Here, for example, a web site may comprise a plurality of documents. As is known, a document may include and/or otherwise relate to a hierarchical or other like structure which specifies a nodal path. By way of non-limiting example, a document (e.g., an XML document or the like) may have an XPath specified in it structure, and/or a document may have some nodal path associated in some manner with a Document Object Model (DOM) or other like implementation.

Figure 2:
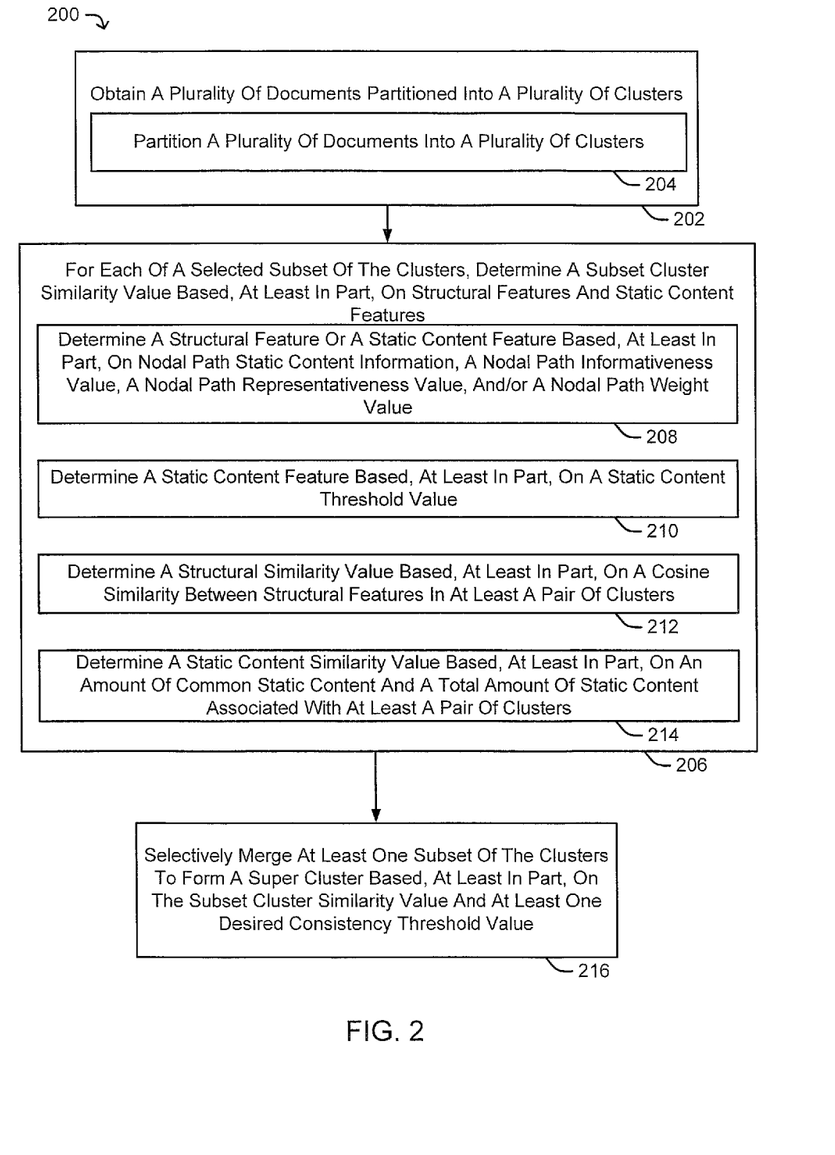
FIG. 2 is flow diagram illustrating a process for use in clustering electronic documents, in accordance with certain example implementations.

Reference is now made to FIG. 2, which is a flow diagram illustrating an example process 200 for use in clustering electronic documents. By way of example, all or part of process 200 may be implemented using computing device 102 of FIG. 1.

At block 202, a plurality of documents partitioned into a plurality of clusters may be obtained. An initial clustering may, for example, be performed in advance using one or more processes. In certain example implementations, at block 204, a plurality of documents may be partitioned into a plurality of clusters based, at least in part, on a Uniform Resource Locator-based clustering process, and/or the like, or any combination thereof.

By way of a non-limiting example, U.S. patent application Ser. No. 12/035,948, filed Feb. 22, 2008 and titled "Structural Clustering And Template Identification For Electronic Documents", describes certain example clustering techniques which may be implemented in whole or part at block 204. Here, for example, a so-called "lightweight" clustering process may be used to initially cluster a plurality of electronic documents. For example, as shown in U.S. patent application Ser. No. 12/035,948, a cost function may be utilized to calculate a cost of generating a template for each of the clusters. If a web page does not completely match a template, a template may be modified to accommodate certain changes introduced by the web page. Such modification may incur a cost. As such, for example, if an incurred cost does not exceed a specified threshold, a web page may be considered to be similar to the web page(s) on which the template was built. If an incurred cost does exceed a specified threshold, a web page may be rejected, or "dropped", and/or otherwise handled separately. By way of example, a specified cost threshold may relate to an amount of acceptable change a web page may induce on a template. Thus, in certain example implementations, a lightweight clustering process may include any of a wide range of techniques for clustering electronic documents that incur relatively small computational costs, including Uniform Resource Locator-based clustering processes and/or the like. As shown in U.S. patent application Ser. No. 12/035, 948, for example, by performing lightweight clustering prior to performing further clustering processes, performance improvements may be realized due to more efficient processing of the clustered documents. An expression-based clustering technique is described in U.S. patent application Ser. No. 12/035,948 that, for example, may be used to further enhance clustering quality, typically, by merging clusters obtained using lightweight clustering (e.g., URL-based clustering). The present techniques as described herein are different and may be more suitable (e.g., more efficient and useful) in certain situations as the present techniques may be implemented independent of such or other like tree-based wrapper frameworks.

At block 206, a subset cluster similarity value is determined for each of a selected subset of clusters based, at least in part, on structural features and static content features associated with each cluster in the subset of clusters.

In certain example implementations, at block 208, at least one of the structural features or at least one of the static content features associated with at least one cluster in the subset of clusters may be determined based, at least in part, on one or more of: nodal path static content information; a nodal path informativeness value; a nodal path representativeness value; and/or a nodal path weight value, associated with one or more of the plurality of documents in at least one cluster. In certain example implementations, at block 210, at least one of the static content features associated with at least one cluster in the subset of clusters may be determined based, at least in part, on at least one static content threshold value. In certain example implementations, at block 212, a structural similarity value for a pair of clusters may be determined based, at least in part, on a cosine similarity between at least one structural feature of each cluster in the pair of clusters. In certain example implementations, at block 214, a static content similarity value for at least a pair of clusters may be determined based, at least in part, on an amount of common static content and a total amount of static content associated with the pair of clusters.

At block 216, at least one subset of clusters may be selectively merged to form a super cluster based, at least in part, on a subset cluster similarity value and at least one desired consistency threshold value. In certain implementations, at block 216, one or more super clusters may subsequently be selectively split into two or more other super clusters based, for example, on a super cluster not being able to satisfy certain desired consistency threshold values. Hence, super clustering techniques may be iteratively or otherwise implemented to refine and test or otherwise form super clusters that meet certain goals.

To further illustrate process 200, some additional non-limiting example implementations are described below with reference to example computing environment 100. Here, for illustration purposes only, the example electronic documents 130 are presumed to relate to web sites and web pages which may be obtained over network 104 from network computing resources 106. For example, the Internet today has an abundance of documents presented in HTML, XML, and/or other like formats. It is not uncommon for online merchants, for example, to present their goods and services in a semi-structured format using scripts to generate a uniform look-and-feel template and/or present information at strategic locations in a template. A web site may employ different templates to generate web pages for different categories, such as, e.g., listing, entity, customer service, etc. As a result, some web pages may be structurally similar in a given category and structurally dissimilar across categories. Further, a category may be split into different sub-categories, for example, to logically group web pages associated with a certain content type, even if the web pages' structures are similar. For example, a product category may be split into "electronics" and "sports", which again may be split into further sub-categories. Such categories/sub-categories may, for example, be reflected in a URL structure. Thus, a clustering process which uses URL patterns, for example, used on its own may fail to properly group (e.g., cluster) structurally similar web pages that may fall into different sub-categories.

Accordingly, process 200 (FIG. 2) illustrates that following an initial clustering process (e.g., at blocks 202-204), additional processing and clustering (e.g., at blocks 206-216) may provide an additional structural and content similarity based model to selectively merge structurally similar clusters.

One potential benefit of process 200 is that the amount of information that may be processed per cluster may be reduced in certain situations. For example, in certain implementations process 200 may increase recall associated with an extraction process, reduce certain costs of annotations, improve learning of wrappers (e.g., as a variety of web pages with slight variations may be available), reduce merging of structurally similar but schema-wise different clusters (e.g., a schema may be a higher level category of a cluster, such as, "product", "travel", or "event", etc.), and/or reduce the number of wrapper matches (e.g., if each wrapper is associated with a URL regular-expression which is matched against a URL (to be extracted) to select an appropriate wrapper).

At blocks 202/204, in certain example implementations, a web site may be partitioned into a set of homogeneous clusters based on a clustering process or other like technique as specified in U.S. patent application Ser. No. 12/035,948.

At blocks 206 and 216, for example, further "super clustering" of documents may be performed to merge structurally similar pages that have similar nodal paths (e.g., XPaths) in the informative region. Such a process may, for example, analyze the structure and content of web pages from each cluster to identify informative structural features 140 (e.g., XPaths) and static content features 138 within each cluster 132 (see FIG. 1). At block 206, structural features 140 and static content features 138 may be used to determine a subset cluster similarity value 136 (e.g., a pair-wise cluster similarity score), which may be considered in determining whether to merge a subset of clusters 134 (e.g., pair-wise similar clusters) to form a super cluster 142.

Thus, in certain example implementations, each cluster may be characterized by XPath and static content features. Here, XPath features may capture structural aspects of web pages in a cluster while static content features may capture certain schema aspects. It is possible for structurally similar clusters to belong to different schemas. As such, process 200 may be enabled to refrain from merging such clusters.

Some example structural features of a cluster are described below. For structural modeling, each cluster may be treated as a collection of XPaths. Let $C=\{C1, \ldots, Cn\}$ be a set of clusters and let $X=\{X1, \ldots, Xm\}$ be a collection of XPaths in these clusters. Here, for example, process 200 may be enabled to weigh each XPath in a collection according to an "informativeness" and/or "representativeness" associated with the cluster.

With regard to an informativeness of an XPath, for example, certain web pages may be structured to comprise not only informative content such as, e.g., product information in a shopping domain, job information in an employment advertisement domain, but may also comprise other content such as, e.g., navigation panels, copyright information, etc. Such other content may be considered as "noise" from an extraction point of view. In certain web pages noise may represent 40-50% of the web page's content if not more, for example. In order to select a representative web page covering most of the attributes, it may be useful to differentiate between "informative XPaths" and "noisy XPaths", e.g., by assigning different nodal path weight values 152 (e.g., weights) to the XPaths.

For this, one may leverage the fact that, in a particular web site, noisy sections may often share common structure and content, while informative sections may often differ in their actual content and/or structure. Accordingly, one may compute a divergence of each XPath, which may represent a measure of uncertainty associated with the XPath and its content across web pages. For example, an informativeness value (e.g., an importance) of an XPath may be determined as:

$I(X)=1-[\text{sum of all } F(X,tj)/(M^*|T|)]$, where, T is set of contents, $\{t1, \ldots, tj, \ldots\}$ associated with XPath, X, F(X, tj) is the number of pages containing X, and tj together, and M is the number of considered web pages. Intuitively, an XPath Xi in a noisy portion of the web page will likely have repeating content across pages, and thus may end up with a low informativeness score (e.g., 0 or close to 0) since $|Ti|==1$ and $F(X, tj)==M$. On the other hand, one may assign a higher informativeness score to an XPath belonging to an informative region which may present more distinct content across web pages (e.g., here, the informativeness score may be 1 or close to 1).

With regard to a representativeness of an XPath, for example, a document frequency of an XPath, F(X) may be defined as a number of documents containing XPath, X. Intuitively, a document frequency of XPath, F(X), indicates its representativeness of the cluster to which it belongs.

With regard to an XPath Weight, for example, one may define, a weight of an XPath, w(X) as a function over XPath representativeness, F(X), and informativeness, I(X), e.g., as shown here: $w(X)=F(X)*I(X)$.

With regard to static content features of a cluster, for example, one may consider static content as an (XPath, content) pair which occurs across pages more than a static content threshold value 154 (e.g., number of times as may be specified in advance and/or otherwise determined/input dynamically). Here, one may expect that clusters belonging to different schemas may tend to have very different static content. Thus, static content may prevent two highly structurally similar, but schema-wise different clusters from being merged into a super cluster. Thus, in certain examples, process 200 may be implemented to eliminate or reduce static content that may be determined to be common across clusters which may contribute to noisy portions of web pages (e.g., footers, headers, etc.). Static content features 138 of a cluster may, for example, comprise a set of static content determined to be local to the cluster, e.g., as defined above.

With regard to subset cluster similarity value 136, (e.g., pair-wise cluster similarity), for example, one may determine a cluster similarity between at least two clusters based, at least in part, on a structural similarity between two clusters as a cosine similarity between structural features of the clusters and static content similarity between two clusters as a ratio of common static content features 162 to total static content features 164 between at least two clusters.

As is known, for example, cosine similarity is a measure of similarity between two vectors of n dimensions by finding the cosine of the angle between them, often used to compare documents in text mining. Given two vectors of attributes, A and B, the cosine similarity, θ, is represented using a dot product and magnitude as $$\text{similarity} = \cos(\theta) = \frac{A \cdot B}{\|A\|\|B\|}.$$

For text matching, the attribute vectors A and B are usually the term frequency vectors of the documents. The cosine similarity can be seen as a method of normalizing document length during comparison. The resulting similarity ranges from −1 meaning exactly opposite, to 1 meaning exactly the same, with 0 indicating independence, and in-between values indicating intermediate similarity or dissimilarity. In the case of information retrieval, the cosine similarity of two documents will range from 0 to 1, since the term frequencies (tf-idf weights) cannot be negative. The angle between two term frequency vectors cannot be greater than 90°. This cosine similarity metric may be extended such that it yields the Jaccard coefficient in the case of binary attributes. This is the Tanimoto coefficient, T(A, B), represented as:

$$T(A, B) = \frac{A \cdot B}{\|A\|^2 + \|B\|^2 - A \cdot B}.$$

At blocks 212 and 214, for example, a score (value) of structural similarity and static content similarity (ss, cs) may be associated with each pair of clusters (ci, cj). With such scores, for example, one may compute a similarity matrix of clusters.

With regard to selectively merging clusters to form a super cluster, for example, a subset cluster similarity value (e.g., similarity of clusters) may be determined between similarity graphs where clusters correspond to nodes within a graph and two nodes are connected by an edge if and only if their structural and static content similarity score (value) (ss, cs) satisfies structural similarity threshold and static content similarity threshold values which may, for example, be predefined or otherwise input/determined dynamically. As such, for example, a super cluster may be determined by clustering nodes in the similarity graph. Since the similarity graph is sparse, each connected component in the similarity graph may be a candidate super cluster. However, since similarity may not be transitive and a consistency check may be performed on each connected component to avoid having dissimilar clusters merged into a super cluster. For example, let C1, C2, . . . , Ck be the clusters in a connected component. Let (Ci1, Cj1), . . . , (Cir, Cjr) be the dissimilar cluster pairs whose similarity is below a certain minimum threshold (e.g., a consistency threshold value 144). Thus, one may partition the component into two or more sub-components such that dissimilar clusters belong to different sub-components. The similar clusters in each subcomponent may be merged to form a super cluster.

Thus, as illustrated in the various example implementations and techniques presented herein, in accordance with certain aspects a method may be provided for use as part of a special purpose computing device and/or other like machine that accesses digital signals from memory and processes such digital signals to establish transformed digital signals which may then be stored in memory.

Some portions of the detailed description have been presented in terms of processes and/or symbolic representations of operations on data bits or binary digital signals stored within memory, such as memory within a computing system and/or other like computing device. These process descriptions and/or representations are the techniques used by those of ordinary skill in the data processing arts to convey the substance of their work to others skilled in the art. A process is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining", "allocating", "establishing", "accessing", "generating" and/or the like refer to the actions and/or processes of a computing platform, such as a computer or a similar electronic computing device (including a special purpose computing device), that manipulates and/or transforms data represented as physical electronic and/or magnetic quantities within the computing platform's memories, registers, and/or other information (data) storage device(s), transmission device(s), and/or display device(s).

According to an implementation, one or more portions of an apparatus, such as computing device 102 (FIG. 1), for example, may store binary digital electronic/electrical signals representative of information expressed as a particular state of the device, here, computing device 102. For example, an electronic binary digital signal representative of information may be "stored" in a portion of memory 120 by affecting or changing the state of particular memory locations, for example, to represent information as binary digital electronic signals in the form of ones or zeros. As such, in a particular implementation of an apparatus, such a change of state of a portion of a memory within a device, such the state of particular memory locations, for example, to store a binary digital electronic signal representative of information constitutes a transformation of a physical thing, here, for example, memory device 120, to a different state or thing.

While certain exemplary techniques have been described and shown herein using various methods and apparatuses, it should be understood by those skilled in the art that various other modifications may be made, and equivalents may be substituted, without departing from claimed subject matter.

Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising, with at least one computing device:
    obtaining one or more electrical signals representing a plurality of clusters, each of said plurality of clusters comprising a plurality of documents;
    for each cluster of a subset of said plurality of clusters: determining one or more static content features of said plurality of documents in said cluster as being local to said cluster rather than common to said subset of said plurality of clusters, identifying one or more structural features of said plurality of documents in said cluster, and determining a weight value for at least one of said one or more structural features based, at least in part, on a measure of uncertainty corresponding to an informativeness value of content for said at least one of said one or more structural features across said plurality of documents in said cluster, said measure of uncertainty based, at least in part, on a computed divergence, with higher divergence corresponding to more informative regions of said plurality of documents in said cluster;
    for said subset of said plurality of clusters: determining a subset cluster similarity value based, at least in part, on: said one or more structural features of said plurality of documents of said each cluster in said subset of said clusters, said weight value, and said one or more static content features of said plurality of documents of said each cluster in said subset of said clusters; and
    merging at least one said subset of said clusters to form a super cluster based, at least in part, on said subset cluster similarity value and at least one desired consistency threshold value.

2. The method as recited in claim 1, further comprising, with said at least one computing device: determining at least one of said structural features or at least one of said static content features based, at least in part, on one or more electrical signals representing at least one of: nodal path static content for one or more of said plurality of documents in said at least one cluster, a nodal path informativeness value for one or more of said plurality of documents in said at least one cluster, or a nodal path representativeness value for one or more of said plurality of documents in said at least one cluster.

3. The method as recited in claim 1, further comprising, with said at least one computing device: determining at least one of said static content features for at least one cluster in said subset of said clusters based, at least in part, on one or more electrical signals representing at least one static content threshold value.

4. The method as recited in claim 1, wherein said subset of said clusters comprises a pair of said clusters, and further comprising, with said at least one computing device: generating one or more electrical signals representing a structural similarity value for said pair of said clusters based, at least in part, on a cosine similarity between said structural features of said plurality of documents of each cluster in said pair of said clusters, and said weight value.

5. The method as recited in claim 1, wherein said subset of said clusters comprises a pair of said clusters, and further comprising, with said at least one computing device: generating one or more electrical signals representing a static content similarity value for said pair of said clusters based, at least in part, on an amount of common static content, or a total amount of static content of said plurality of documents of said pair of said clusters.

6. The method as recited in claim 1, wherein:
    said subset of said clusters comprises a pair of said clusters;
    said subset cluster similarity value comprises a static content similarity value and a structural similarity value of said plurality of documents of said pair of said clusters; and
    said at least one desired consistency threshold value comprises one or more electrical signals representing at least one static content similarity threshold value based, at least in part, on said static content similarity value, and at least one structural similarity threshold value for said structural similarity value.

7. The method as recited in claim 1, wherein said at least one of said one or more structural features corresponds to an XPath.

8. An apparatus comprising:
    memory; and
    at least one processing unit to:
    obtain, from said memory, a plurality of clusters, each of said plurality of clusters comprising a plurality of documents;

for each cluster of a subset of said plurality of clusters:
determine one or more static content features of said plurality of documents in said cluster as being local to said cluster rather than common to said subset of said plurality of clusters, identify one or more structural features of said plurality of documents in said cluster, and determine a weight value for at least one of said one or more structural features based, at least in part, on a measure of uncertainty corresponding to an informativeness value of content for said at least one of said one or more structural features across said plurality of documents in said cluster, said measure of uncertainty based, at least in part, on a computed divergence, with higher divergence corresponding to more informative regions of said plurality of documents in said cluster;

for said subset of said plurality of clusters: determine a subset cluster similarity value based, at least in part, on: said one or more structural features of said plurality of documents of said each cluster in said subset of said clusters, said weight value, and said one or more static content features of said plurality of documents of said each cluster in said subset of said clusters;

merge at least one said subset of said clusters to form a super cluster based, at least in part, on said subset cluster similarity value and at least one desired consistency threshold value; and provide at least said super cluster to said memory.

9. The apparatus as recited in claim 8, said at least one processing unit to further determine at least one of said structural features or at least one of said static content features based, at least in part, on at least one of: nodal path static content for one or more of said plurality of documents in said at least one cluster, a nodal path informativeness value for one or more of said plurality of documents in said at least one cluster, or a nodal path representativeness value for one or more of said plurality of documents in said at least one cluster.

10. The apparatus as recited in claim 8, said at least one processing unit to further determine at least one of said static content features for at least one cluster in said subset of said clusters based, at least in part, on at least one static content threshold value.

11. The apparatus as recited in claim 8, wherein said subset of said clusters comprises a pair of said clusters, and said at least one processing unit to further determine a structural similarity value for said pair of said clusters based, at least in part, on a cosine similarity between said structural features of said plurality of documents of each cluster in said pair of said clusters.

12. The apparatus as recited in claim 8, wherein said subset of said clusters comprises a pair of said clusters, and said at least one processing unit to further determine a static content similarity value for said pair of said clusters based, at least in part, on an amount of common static content, or a total amount of static content of said plurality of documents of said pair of said clusters.

13. The apparatus as recited in claim 8, wherein:
said subset of said clusters comprises a pair of said clusters;
said subset cluster similarity value comprises a static content similarity value and a structural similarity value of said plurality of documents of said pair of said clusters; and
said at least one desired consistency threshold value comprises at least one static content similarity threshold value based, at least in part, on said static content similarity value, and at least one structural similarity threshold value for said structural similarity value.

14. An article comprising:
a non-transitory computer readable medium having computer-implementable instructions stored thereon that are executable by one or more processing units in a computing device to enable said computing device to:
obtain a plurality of clusters, each of said plurality of clusters comprising a plurality of documents;
for each cluster of a subset of said plurality of clusters: one or more static content features of said plurality of documents in said cluster as being local to said cluster rather than common to said subset of said plurality of clusters, identify one or more structural features of said plurality of documents in said cluster, and determine a weight value for at least one of said one or more structural features based, at least in part, on a measure of uncertainty corresponding to an informativeness value of content for said at least one of said one or more structural features across said plurality of documents in said cluster, said measure of uncertainty based, at least in part, on a computed divergence, with higher divergence corresponding to more informative regions of said plurality of documents in said cluster;

for said subset of said plurality of clusters: determine a subset cluster similarity value based, at least in part, on: said one or more structural features of said plurality of documents of said each cluster in said subset of said clusters, said weight value, and said one or more static content features of said plurality of documents of said each cluster in said subset of said clusters; and merge at least one said subset of said clusters to form a super cluster based, at least in part, on said subset cluster similarity value and at least one desired consistency threshold value.

15. The article as recited in claim 14, wherein said computer-implementable instructions are further executable by said one or more processing units in said computing device to determine at least one of said structural features or at least one of said static content features based, at least in part, at least one of: nodal path static content for one or more of said plurality of documents in said at least one cluster, a nodal path informativeness value for one or more of said plurality of documents in said at least one cluster, or a nodal path representativeness value for one or more of said plurality of documents in said at least one cluster.

16. The article as recited in claim 14, wherein said computer-implementable instructions are further executable by said one or more processing units in said computing device to determine at least one of said static content features for at least one cluster in said subset of said clusters based, at least in part, on at least one static content threshold value.

17. The article as recited in claim 14, wherein said subset of said clusters comprises a pair of said clusters, and wherein said computer-implementable instructions are further executable by said one or more processing units in said computing device to determine a structural similarity value for said pair of said clusters based, at least in part, on a cosine similarity between said structural features of said plurality of documents of each cluster in said pair of said clusters.

18. The article as recited in claim 14, wherein said subset of said clusters comprises a pair of said clusters, and wherein said computer-implementable instructions are further executable by said one or more processing units in said computing device to determine a static content similarity value for said pair of said clusters based, at least in part, on an amount of common static content, or a total amount of static content of said plurality of documents of said pair of said clusters.

19. The article as recited in claim 14, wherein:

said subset of said clusters comprises a pair of said clusters;

said subset cluster similarity value comprises a static content similarity value and a structural similarity value of said plurality of documents of said pair of said clusters; and said at least one desired consistency threshold value comprises one or more electrical signals representing at least one static content similarity threshold value based, at least in part, on said static content similarity value, and at least one structural similarity threshold value for said structural similarity value.

20. The article as recited in claim 14, wherein said computer-implementable instructions are further executable by said one or more processing units in said computing device to partition said plurality of documents into said plurality of clusters based, at least in part, on at least one of a Uniform Resource Locator-based clustering process.

\* \* \* \* \*